United States Patent
Bankston

[15] 3,668,810
[45] June 13, 1972

[54] THEATER WITH SEPARATE VIEWING BOOTHS

[72] Inventor: Earl F. Bankston, Jackson, Tenn.
[73] Assignee: Cabana Theatres, Inc., Jackson, Tenn.
[22] Filed: July 17, 1970
[21] Appl. No.: 55,661

Related U.S. Application Data

[63] Continuation-in-part of Ser. No. 796,952, Feb. 6, 1969, Pat. No. 3,545,143.

[52] U.S. Cl. ..............................................................52/6
[51] Int. Cl. ......................................................E04h 3/30
[58] Field of Search .............................52/6, 7, 8; 117/124

[56] References Cited

UNITED STATES PATENTS

| | | | |
|---|---|---|---|
| 1,701,590 | 2/1929 | Oliver | 350/124 |
| 2,102,718 | 12/1937 | Josserand | 52/6 |
| 2,694,231 | 11/1954 | Bermejo | 52/73 |
| 3,422,581 | 1/1969 | Allen | 52/174 |
| 3,545,143 | 12/1970 | Bankston | 52/6 |

OTHER PUBLICATIONS

The Washington Daily News Oct. 2, 1933 page 28

Primary Examiner—John E. Murtagh
Attorney—Clarence A. O'Brien and Harvey B. Jacobson

[57] ABSTRACT

Theater construction with a series of separate viewing booths arranged in one or more rows with the rows curving about the screen area and the individual booths being directed toward the screen for a clear viewing thereof by the occupants. Each booth is provided with an observation window which, in size, so relates to the screen as to approximately mask at least three edges of the screen and present an impression of viewing a scene occurring immediately occuring outside the window. The areas around both the screen and the window are painted a flat black to enhance the impression of viewing a scene rather than a projection on a screen.

7 Claims, 5 Drawing Figures

PATENTED JUN 13 1972

Earl F. Bankston
INVENTOR.

BY Clarence A. O'Brien
and Harvey B. Jacobson
Attorneys

Earl F. Bankston
INVENTOR.

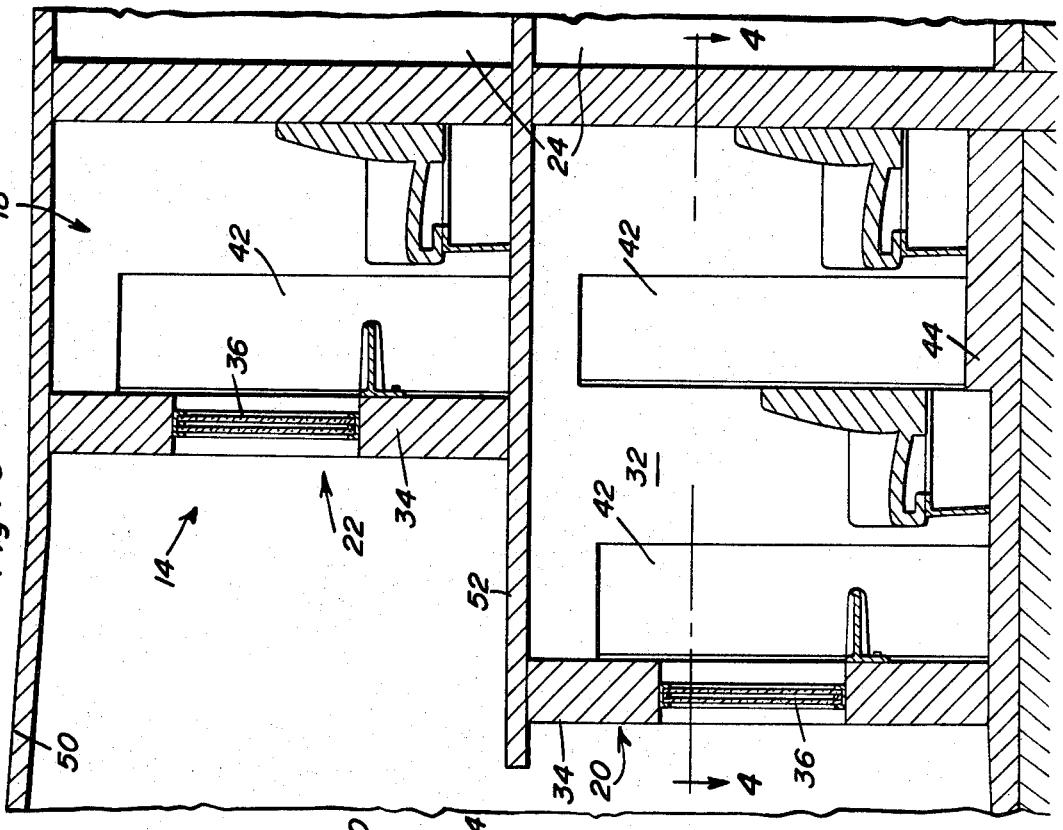
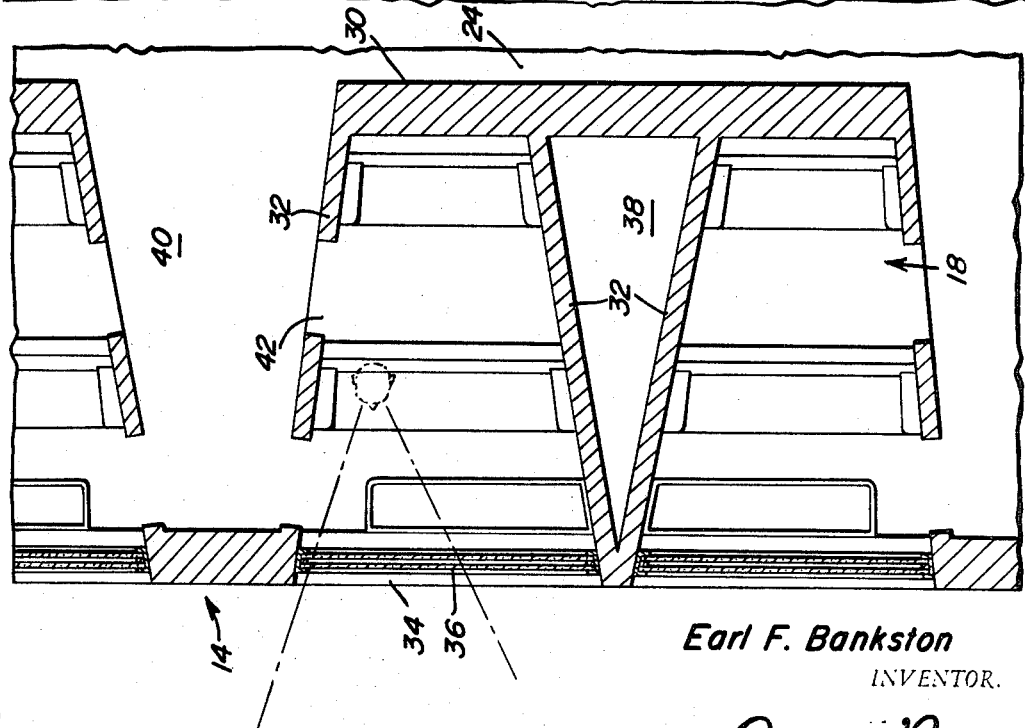

THEATER WITH SEPARATE VIEWING BOOTHS

This is a continuation-in-part of Ser. No. 796,952, filed Feb. 6, 1969, for "Theater Construction", now U.S. Pat. No. 3,545,143.

The present invention generally relates to theaters, and is more particularly concerned with a uniquely constructed theater wherein the audience seating comprises one or more rows or tiers of separate viewing booths, each booth being so orientated as to provide the occupants thereof with an unencumbered view of the screen.

Of particular significance with regard to the instant invention is the provision of a forward observation window in each viewing booth which is of a size, and so related to the screen as to, as the picture on the screen is observed, approximately, mask or align with the top, bottom and one edge of the screen to give the impression of viewing a scene occurring directly outside the window. This impression is enhanced by the painting of the structure about the screen black, preferably a non-reflecting flat black, and likewise about the window itself.

In conjunction with the above object, it is also a highly significant object of the instant invention to provide a theater construction wherein the members of the audience are assured of complete privacy, eliminating the inconveniences and annoyances normally encountered in attending movies or the like. This is achieved through the provision of individual booths wherein the viewer will normally be seated only with his own party.

In conjunction with the above object, another object of the invention resides in the provision of a theater wherein the distractions encountered with large audiences are avoided. Likewise, the occupants of the individual booths can control their environment, including temperature, lighting, sound level, and the like, to provide maximum comfort.

In achieving the above objects, the theater construction herein includes one or more rows or tiers of separate viewing booths arranged arcuately about a screen. When more than one row is contemplated, as will normally be the case, the rows are stacked one above the other, the upper row either aligning with the lower row or being offset rearwardly from the front face thereof. The individual booths, one of which may be enlarged so as to provide a small general audience area, have the walls thereof angled so as to ensure a complete viewing of the screen by the booth occupants. Each booth is provided with an observation window which is of a size so related to the size of and distance to the screen as to approximately mask three sides of the screen. The audience area, that is the rows of booths, will be covered. However, the screen can either be an outdoor screen or enclosed by walls and a roof extending thereto from the audience area. If the area between the screen and the audience is to be enclosed, the inner faces thereof are to be painted a flat black so as to provide no distractions to the scene on the screen, and likewise to co-operate with the masking effect of the individual observation windows so as to avoid the obvious effect of viewing a picture on a remote screen. The theater features herein involved are of course equally adaptable for single, twin or multiple theaters, each theater unit being individually formed and accessible from a single central lobby area.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged cross-sectional view taken substantially on a plane passing along line 3—3 in FIG. 2;

FIG. 4 is a cross-sectional view taken substantially on a plane passing along line 4—4 in FIG. 3.

Figure 1:
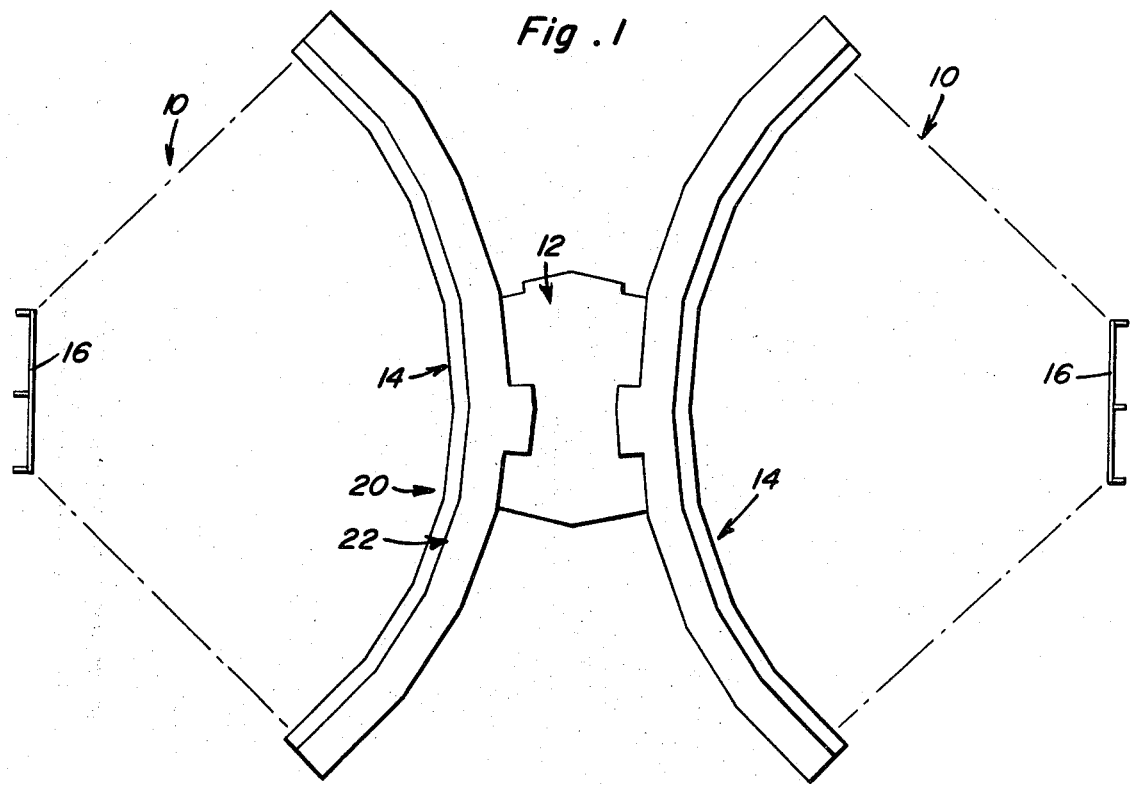
FIG. 1 is a general plan layout of a twin theater incorporating the features of the instant invention.

Referring now more specifically to the drawings, reference numeral 10 is used to generally designate the theater construction of the instant invention. This construction, as suggested in FIG. 1, can be coupled with a similar unit about a central lobby area 12 so as to form a twin theater. Each theater 10 includes an audience area or seating area 14 and a forwardly located viewing screen 16.

The audience seating area 14 is formed of a series of individual viewing booths 18 arranged in one or more rows arcing about the centrally orientated screen 16. It will be appreciated that the construction illustrated in the drawings consists of two such rows or tiers, hereinafter designated by reference numeral 20 for the lower tier and reference numeral 22 for the upper tier or tiers. Each tier includes, in addition to the individual booths 18, a rear full length hallway 24 which provides access to the booths, and a central entry 26 to the hallway 24 which, in the case of the first or lowest tier, is directly accessible from the central lobby, and, in the case of the upper tier or tiers, is accessible by means of stairs 28 or the like.

The individual booths 18, whether two seat booths as illustrated with the lower tier 20 or single seat booths as illustrated with the upper tier 22, have a solid rear wall 30 defining the hallway 24, a pair of forwardly diverging side walls 32, and a front wall 34 having an enlarged viewing window 36 therein. The forwarding diverging side walls 32 of the booths, in conjunction with the arcuate arrangement of the row, ensures to the booth occupants a complete visibility of the screen. The arcuate row or rows, can be formed either along a smooth curvature or in angular segments. The booths 18 will normally be arranged in adjoining pairs with the space 38 defined therebetween by the adjacent diverging walls 32 being adaptable for use as a storage area or for maintenance and cleaning equipment. Access to the booth is provided by a short hallway 40 between adjoining pairs of booths with the booth side walls 32 bordering on the short passageway 40 having one or more doorways 42 therein depending upon the number of seats provided. If so desired, additional privacy can be obtained by providing doors on the doorways 42 or a single outer door where each individual passageway 40 joins the main access hall 24.

Figure 2:
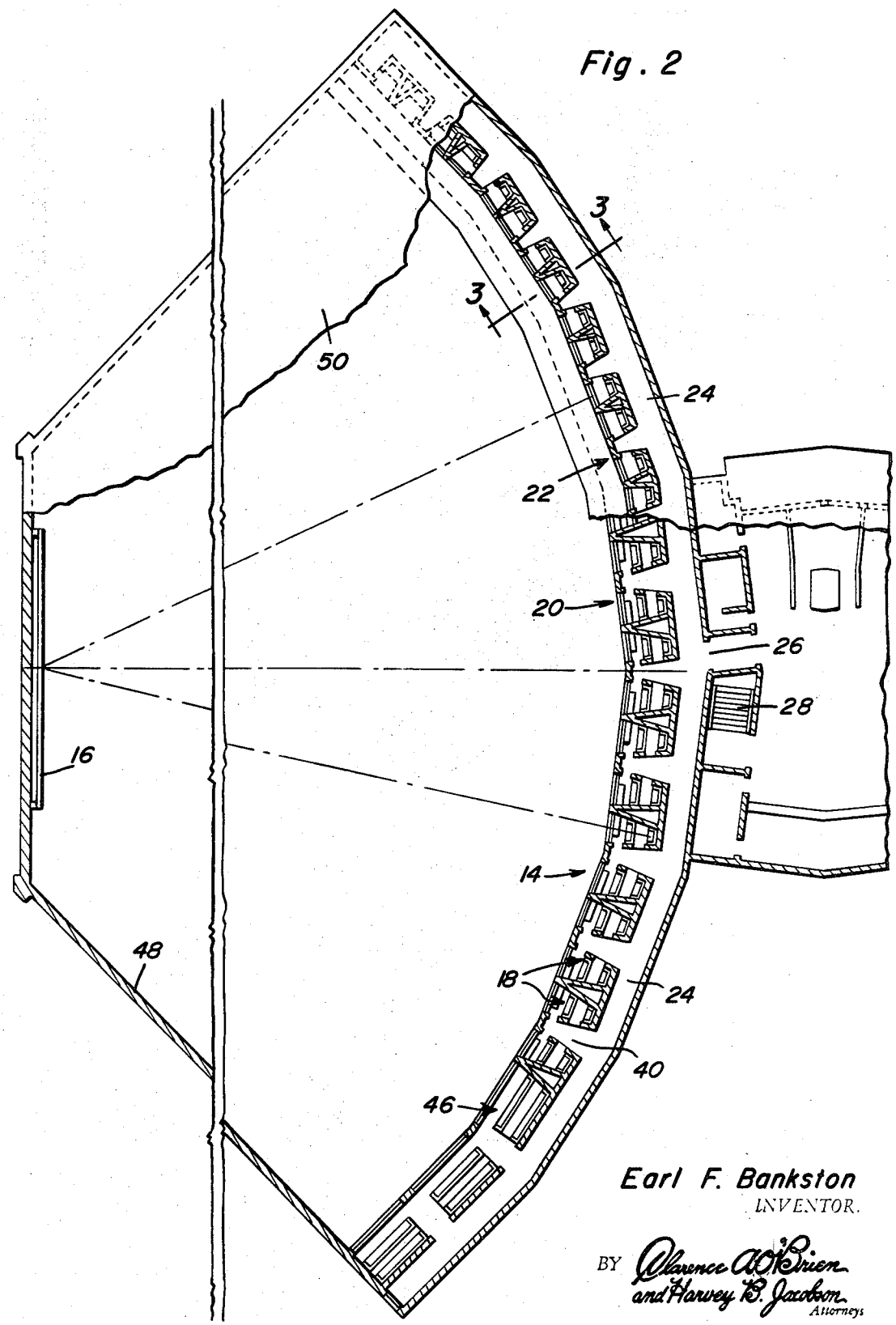
FIG. 2 is an enlarged plan view, with portions broken away for purposes of illustration, of one theater unit.

With reference to FIG. 3, it will be noted that when two seats are provided in a booth 18, the rear seat will normally be positioned on an elevated step 44 for a better viewing of the screen. It is contemplated that the forward seat will accommodate two or three adults, while the rear seat can comfortably accommodate two adults. Further, noting FIG. 2, an enlarged booth area 46 can be provided as a general audience area so as to accommodate a large number of persons, much in the manner of a conventional theater.

Figure 5:
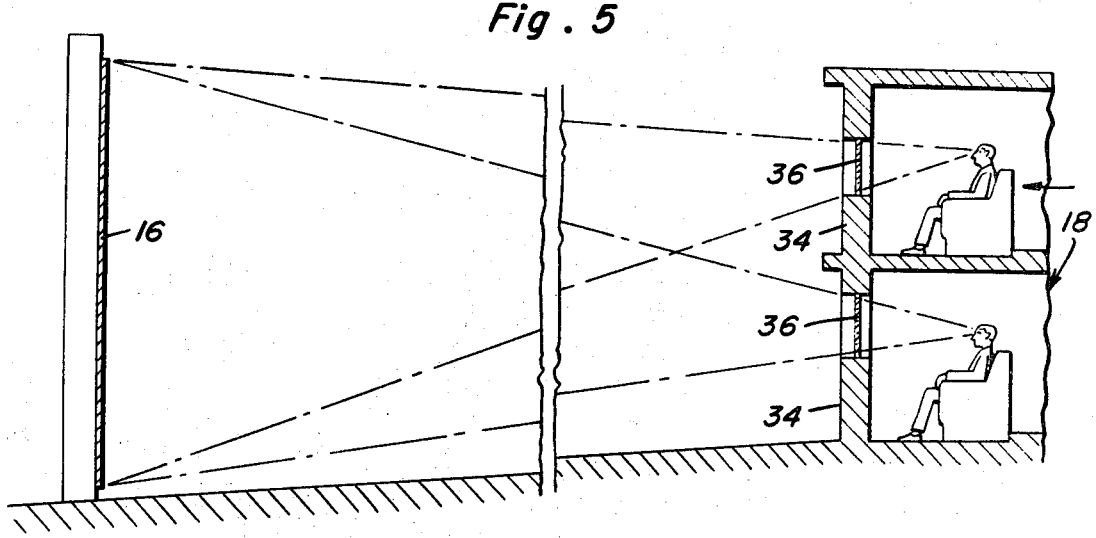
FIG. 5 is an elevational cross-section illustrating the line of sight of booth occupants, as well as an alternate aligned stacking of the rows.

Of particular significance with regard to the instant invention is the orientation of the observation window 36 provided in the front wall 34 of each of the booths 18, and its relationship to the distance to and size of the screen 16. More particularly, the observation window 36 is to be of such a size and so located as to provide, to a seated occupant, upper and lower edges, and one side edge which generally correspond to the upper and lower edges and one side edge of the screen 16, thus in effect providing an approximate mask about three sides of the screen, blocking out any distracting structure about the screen. This in turn eliminates any feeling of distance between the viewer and the screen, and gives an illusion of the picture actually being a scene which is occurring immediately in front of the observation window, thereby greatly enhancing the enjoyment of the picture and providing a new experience in movie viewing. This general alignment of three sides of the observation window with three sides of the screen along the view path or line of sight of a booth occupant has been suggested in FIGS. 4 and 5. The second side of the screen 16, which is not masked by the second side of the observation window, due to the desirability of accommodating more than one occupant in each booth, is provided with an area, a black border or the like, which is painted in flat black so as to provide for no distracting reflection or the like and provide a masking effect which is sufficient so as to, when taken in conjunction with the substantial masking of the remaining three sides of the screen by the observation window, not distract from the desired effect. In order to enhance the masking effect, the inner face of the front wall 34, about the window, can also be painted a flat black.

While the screen 16 can be an outdoor screen, if so desired, the area between the audience area 14 and the screen 16 can be enclosed by side walls 48 and a roof 50, in which case the interior surfaces thereof will also be painted in a flat black, and no illumination will be provided, thereby not interfering with the sought-after effect of the projected scene occurring immediately adjacent the observation window of each booth.

With reference to FIG. 3, it will be noted that each row or tier of booths is provided with a roof 52 thereover, which roof will at least slightly overhang the front wall 34 so as to provide a drip edge and protection for the observation window 36 should a building enclosing roof 50 not be provided. Further, noting FIGS. 3 and 5, the upper tier or tiers 22 can either be offset rearwardly from the front wall of the lower tier or vertically aligned therewith. The rearward offsetting of the upper tiers will normally be the case when the upper booths 18 are smaller than the lower booths, accommodating one seat as opposed to the two seats in the lower booth, as suggested in FIGS. 2 and 3.

From the foregoing, it will be appreciated that a highly unique theater construction has been defined. This construction provides for individual viewing booths in the audience area wherein privacy and comfort is ensured. In addition, a unique viewing experience is provided through the utilization of observation windows whereby the occupants of the booths view the screen in a manner whereby the picture thereon appears to be occurring immediately in front of the window, rather than at a distance therefrom. This effect is heightened by a complete blacking out of the area about the screen and between the screen and the audience area or tiers of viewing booths. The audience area is completely enclosed by a continuous roof provided over all of the booths in each row. It will of course be appreciated that the roofs of the lower rows form, either in their entirety or by a portion thereof, the floors of the superjacent rows. By the same token, the area between the audience area and the screen can be roofed so as to provide for the showing of movies during the day.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a theater, an enclosed building, an audience area defined in said building, and a rectangular screen spaced forwardly thereof, said audience area comprising a plurality of individual viewing booths, said building including interior side walls provided between and defining said booths, each booth including occupant seating means and an interior forward wall having a rectangular viewing window for an exposure of the screen therethrough, said viewing window being of a size and orientation relative to said screen so as to approximately mask the top, bottom and one side of the periphery of the screen whereby a visual effect of a screen projected scene occurring immediately forward of the window is achieved, the screen being provided with a surrounding area colored black, said screen being positioned within said building with the space between the audience area and the screen being enclosed by the building walls and roof which walls and roof have the interior surfaces thereof blackened to avoid visual distraction about the screen and between the audience area and the screen.

2. The construction of claim 1 including a second row of booths overlying said first row of booths and generally co-extensive therewith, one of said rows including an enlarged general viewing area.

3. The construction of claim 2 wherein each booth is in general alignment with the screen and has the side walls separating it from the adjoining booths diverging forwardly toward the associated viewing window and the screen forward thereof so as to ensure complete visibility of the screen by the booth occupants.

4. In a theater, an enclosed building including an audience area and a forwardly located screen, said audience area comprising a plurality of individual viewing booths, said booths being arranged in at least one row, said building including interior side walls provided between and defining said booths, said row being generally arcuate with each of the booths therein in general alignment with the screen, a forward wall along said booths, each of said booths including an enlarged viewing window through said forward wall for a viewing of the screen therethrough by a booth occupant, the building between the forward wall and the screen, being provided with an interior colored black to avoid any visual distraction between the audience area and the screen.

5. The construction of claim 4 wherein the side walls each booth are forwardly diverging side walls for enabling an exposure of the entire screen to the booth occupants.

6. The construction of claim 5 wherein a second row of similarly formed booths is provided in superimposed relation on the first row of booths, the second row of booths being of substantially equal length with the first row of booths, and access means to the booths in each row, said access means comprising an elongated building hallway extending along and behind each row of booths.

7. The construction of claim 6 wherein the viewing window in each booth includes upper and lower edges so orientated as to, along the line of sight of a booth occupant, generally align with the upper and lower edges of the screen.

* * * * *